3,316,189
PRINTING INK COMPRISING POLYOL, POLYISO-CYANATE AND POLYMERIC RESIN HARDENER
George M. Adams, Palos Heights, Ill., assignor to Union Carbide Corporation, a corporation of New York
No Drawing. Filed Oct. 4, 1963, Ser. No. 313,744
15 Claims. (Cl. 260—13)

The present invention relates to rapid drying printing ink compositions for polymeric films, methods of printing with said inks, and polymeric films printed with said inks. More particularly the present invention relates to a printing ink for printing upon cellulosic sausage casing, which can be rapidly dried to a tack free condition by exposure to heat and yet which exhibits a relatively long usable pot life.

A satisfactory ink for printing on polymeric films, such as regenerated cellulose sausage casings, must form a clear, sharp glossy print which has good covering power, it must exhibit tenacious adhesion to the film, and it must withstand the wrinkling, stretching or shrinkage to which the film is normally subjected during use. Additionally, the ink must remain unaffected by temperatures encountered in smoking and cooking, that is, without discoloring or peeling from the film. A highly desirable property of such inks is the ability to dry rapidly allowing the film to be printed, reeled and stored without offsetting, or blocking.

Heretofore, ink compositions have been used, based upon such materials as alkyd resins, drying oil modified alkyd resins, oil modified epoxy resins and the like. None of these inks has proven entirely satisfactory, because the relatively slow drying rates of these inks necessitates the use of offset sprays or slip sheets to permit stocking or reeling.

In accordance with the present invention a printing ink has been found which meets all the necessary and desired properties of printing inks as set forth above. In general these printing inks comprise:

(1) A polyol prepolymer
(2) An isocyanate prepolymer
(3) A polymeric resin hardener, preferably reactive
(4) A pigment, and
(5) A volatile organic solvent The polyol prepolymer that can be used in the compositions of this invention can be exemplified by:

(1) Polyester polyols
(2) Polyether polyols
(3) Castor polyols

The polyester polyol prepolymers which are the esterification products of polyhydric alcohols and polycarboxylic acids are preferred. These polyesters can be prepared by known esterification techniques utilizing an excess of polyhydric alcohol in the reaction. This excess produces a polyester having free hydroxy groups.

Polyhydric alcohols which can be used in the preparation of these polyesters polyols include ethylene glycol, diethylene glycol, propylene glycol, dipropylene glycol, trimethylolpropane, 1,4-butylene glycol, glycerine, pentaerythritol and the like.

The polycarboxylic acids which can be used in the preparation of the polyester polyols include maleic acid, fumaric acid, itaconic acid, phthalic acid, terephthalic acid, isophthalic acid, succinic acid, adipic acid, sebacic acid, azelaic acid and the like.

Preferred polyester polyols are those made from diacids such as adipic acid and diols such as 1,4-butanediol. These linear polyesters have been found to produce inks having long pot life and which, when applied, dried and cured, give imprints of exceptionally durability. Illustrative of the polyester polyols that have been found useful is one sold under the tradename Multron R–16.

The polyether polyols which have been found useful in the present invention are the alkylene oxide adducts of polyhydroxy alkanes, trialkanolamines, or polyamines.

Illustrative alkylene oxide adducts of polyhydroxy alkanes include, among others, those adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol and the like, preferably having a molecular weight of at least 500. The adducts of ethylene oxide, propylene oxide, epoxybutane, or mixtures thereof are preferred.

Two particularly preferred classes of alkylene oxide adducts of polyhydroxyalkanes are the ethylene oxide, propylene oxide, butylene oxide, or mixtures thereof, adducts of dihydroxyalkanes and of trihydroxyalkanes.

The preferred class of alkylene oxide adducts of dihydroxyalkanes contemplated are the adducts of polyoxyalkylene glycols, such as diethylene glycol, triethylene glycol, tetraethylene glycol, dipropylene glycol, tripropylene glycol, tetrapropylene glycol, dibutylene glycol, high molecular weight polyoxyethylene glycols, high molecular weight polyoxypropylene glycols, mixed ethylene-propylene glycols, mixed polyoxyethylene-polyoxypropylene glycols, and the like.

Another useful class of polyols which acn be employed are the alkylene oxide adducts of the trialkanolamines. Illustrative trialkanolamines include triethanolamine, triisopropanolamine, and tributanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides which have 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4- 1,5-, and 1,6-hexanediamine, phenylenediamines, toluenediamine, naphthalenediamines, and the like. Among the compounds of the above groups which are of particular interest are, among others, N,N,N',N'-tetrakis(2 - hydroxyethyl)ethylenediamine, N,N,N',N'-tetrakis(2 - hydroxypropyl)ethylenediamine, N,N,N',N",N"-pentakis(2 - hydroxypropyl)diethylenetriamine, phenyldiisopropanolamine and higher alkylene oxide adducts of aniline, and the like. Others which deserve particular mention are the alkylene oxide adducts of aniline or substituted aniline/formaldehyde condensation products.

The castor polyols are the polyol derivatives of castor oil. Illustrative of the castor polyols are castor oil itself and modified castor oil such as totally or partially oxidized castor oil, or chemically polymerized castor oil.

The amount of polyol prepolymer used in the printing ink compositions of the present invention is generally from about 20 to about 40 percent of the total weight of the resinous, non-volatile components of the ink, i.e., polyol prepolymer, polyisocyanate prepolymer, and hardener resin. It has been found preferable, however, to use an amount of from 22 to 28 percent as optimum adhesion and excellent coating characteristics are obtained from inks containing this preferred amount.

The amount of polyol prepolymer used in the ink compositions is determined in relationship to the amount of isocyanate prepolymer. It has been found that a ratio of available isocyanate groups (NCO) to available polyol hydroxyl (OH) groups of from 2.0/1.0 to 5.0/1.0 is both desirable and useful. If less than a 2.0/1.0 ratio is used, the dried ink film is soft and exhibits low adhesion. If more than a 5.0/1.0 ratio is used, the dried ink film is brittle and exhibits low strength characteristics such as cracking and flaking when the film is stretched or flexed. The preferred ratio of NCO/OH is from about 2.5/1.0 to about 4.0/1.0.

The polyisocyanate prepolymer component of the compositions of this invention are well known in the art. Their preparation is described in Canadian Patent 639,921 issued April 17, 1962 which is hereby incorporated by reference. Generally these polymers are prepared by reacting a suitable organic polyisocyanate and a suitable polyhydric alcohol at a temperature of from about 80° to about 140° C. for a period of from about 1 to about 6 hours.

Suitable organic polyisocyanates for the preparation of isocyanate prepolymers include tetramethylene diisocyanate, hexamethylene diisocyanate, m-xylylene diisocyanate, p-xylylene diisocyanate, 4,6-dimethyl-1,3-xylylene diisocyanate, cyclohexane-1,4-diisocyanate, dicyclohexylmethane-4,4'-diisocyanate, m-phenylene diisocyanate, p-phenylene diisocyanate, 1-alkylene benzene-2,4-diisocyanate, such as 2,4-tolylene diisocyanate, 3-(α-isocyanatoethyl)phenyl isocyanate, 1-alkyl benzene-2,6-diisocyanates such as 2,6-tolylene diisocyanate, 2,6-diethylbenzene-1,4-diisocyanate, diphenylmethane-4,4'-diisocyanate, diphenyl dimethylmethane-4,4'-diisocyanate, 3,3'-dimethoxy diphenylmethane-4,4'-diisocyanate, naphthalene-1,5-diisocyanate and mixtures thereof and the like.

Suitable polyhydric alcohols for the preparation of the isocyanate prepolymers include ethylene glycol, trimethylol propane, trimethylolethane, diethylene glycol, propylene glycol, 1,4-butylene glycol, glycerine, pentaerythritol and the like, and polyether polyols and castor oil as mentioned previousy.

The amount of polyisocyanate prepolymer generally used in the subject printing ink compositions is from 25 to 45 percent by weight based upon the total amount of the resinous, non-volatile components in the ink and is preferably used in an amount of from 27 to 35 percent. This preference is dictated by the superior adhesion of the cured ink and the longer pot life obtained from using the compositions containing isocyanate prepolymers in the preferred amounts.

The polymeric resin hardeners which are used in the present invention are those polymers or polymer mixtures which are compatible with the polyester prepolymer-polyisocyanate prepolymer system and which preferably contain at least one group per molecule which can react with isocyanate groups. Illustrative of such groups are hydroxyl groups, amine groups, amide groups, carboxylic acid groups and the like.

Included within the term polymeric resin hardeners are vinyl resins and preferably vinyl resins containing 4 percent hydroxyl as vinyl alcohol (or one reactive group per polymer molecule) such as polyvinyl chloride-acetate resin, polyvinyl alcohol-acetate resin, polyvinyl butyral resins; cellulosic resins, preferably containing at least 0.5 percent hydroxyl groups such as cellulose acetate, cellulose acetate propionate, cellulose butyrate, cellulose acetate butyrate; and the like.

It should be noted that the cellulose ester type hardener is preferred as these hardeners are easily incorporated, and produce excellent prints. Within this class of compounds, cellulose acetate butyrate is the most preferred hardener, as this material produces imprints of excellent quality, does not increase the ink viscosity excessively at usable levels and being less thermoplastic provides greater initial hardening effect.

The polymeric resin hardener is generally used in an amount of from about 15 to about 50 percent by weight based upon the total amount of the resinous non-volatile components of the composition. It has been found desirable however, to use from about 40 to 45 percent by weight based upon the total amount of resinous, non-volatile components of the composition as offset is eliminated at this level without such an increase in ink viscosity as would adversely affect printing.

By the term "pigment" as used herein is meant those colored organic and inorganic compounds which are normally used in the art to impart color as well as organic dyes which are used for the same purpose. There is no restriction as to pigments or dyes except that they be non-reactive to the components of the ink. Illustrative of the various inorganic pigments are titanium dioxide, carbon black, metallic flakes, powders and dusts such as aluminum powder, bronze powder, and the like. Organic pigments and dyes which can be used include Phthalocyanine green, Phthalocyanine blue, Permanent red 2B, Lithol red, Lithol rubine, Toluidine red, Hansa yellow, Toluidine yellow, oil soluble dyes and the like.

There is no criticality in respect to the amount of coloring material to be used. However, sufficient colorant should be used to provide good covering preperties with the proper density of color. While economic factors generally determine the maximum amount of pigment to be used, it goes without saying that pigments should not be used in such amounts as to cause the ink to chalk on drying, or to make the viscosity of the ink unreasonably high. Generally, pigments are used in an amount of from 20 to 60 percent based on the total non-volatile components of the ink. Naturally the specific amount of pigment used is dependent upon the coloring properties of the pigment, the properties of the inks and so forth.

The volatile organic solvents which are used in the printing inks of the present invention are those which are compatible and non-reactive to the components of the inks, evaporate readily and which do not attack the film substrate.

Examples of suitable volatile organic solvents are aliphatic esters containing from 3 to 8 carbon atoms inclusive, such as methyl acetate, ethyl acetate, n-propyl acetate, isopropyl acetate, amyl acetate and the like; and the nitroalkanes containing from 2 to 3 carbon atoms inclusive such as nitroethane, 1-nitropropane, 2-nitropropane and the like. 2-nitropropane is the preferred solvent for the printing ink compositions of this invention.

Additionally it should be noted that aromatic hydrocarbons such as benzene, toluene, xylene and the like can be used in the present printing ink if said inks are to be used on equipment such as rotogravure presses where there is no contact with rubber rolls. Inks containing these solvents should not be used on flexographic equipment as the rubber rolls swell and crack on contact with these solvents.

Mixtures of solvents can also be used provided that the solvent system meets the requirements of suitability set forth above.

The amount of solvent used in the present printing inks is dependent upon operating conditions such as press speed, ink formulation and the like. The viscosity of the ink is varied by the addition of solvent to obtain optimum printing. Generally however, the amount of solvent used is from about 50 to 80 percent by weight based upon the total ink composition.

It should be noted that it is preferred to dissolve the ingredients separately in portions of the solvents to facilitate mixing, just prior to use to avoid premature reaction and gelation.

The subject printing ink compositions are conveniently prepared by dissolving the polymeric resin hardener in the solvent and blending into this solution the pigment, and the polyester polyol. For convenience the pigment can be dispersed in the polyester polyol and/or the resin hardener prior to admixture.

This mixture is very stable and can be stored indefinitely as long as it does not become contaminated with water which will react with isocyanate when mixed. When the ink is to be used, the polyisocyanate prepolymer is added to the previously prepared mixture and is blended therewith. For convenience in blending it is generally desirable to disperse the polyisocyanate prepolymer in a portion of the ink solvent. This facilitates rapid dispersion.

The ink is then charged to the reservoir of a flexographic printing press and is printed onto cellulosic film. This ink has a useful pot life of about 24 hours after the polyisocyanate prepolymer has been admixed with the other ingredients in admixture.

The printed cellulosic film is then air dried by subjecting it to high velocity air at a temperature of from about 100° F. to 250° F. for a period of from 1 to 15 seconds. In a continuous process this drying is conveniently accomplished by drawing the film through a hot air dryer at a rate of about 350 feet per minute while maintaining the air temperature of the oven at from about 150° F. to about 200° F. Variations in this drying process can be made to suit individual conditions and such modifications would be readily apparent to one skilled in the art. However, the drying process should be such that solvent evaporation is effected and that sufficient cure of the ink is produced to enable the film to be reeled without blocking or offsetting.

After the printed cellulosic film has been dried it is conveniently accumulated on storage reels, where the printed ink composition attains complete cure.

As is noted from the above-described processes of preparing and applying the printing inks of the present invention, these inks cure "in situ" on the printing substrate. The drying step serves to evaporate the ink solvent and to produce sufficient initial cure to enable the "print" to be tack free under the presure encountered in reeling. The subsequent slow final cure produces greatly enhanced adhension to the cellulose.

It should also be noted that the printing inks of the present invention exhibit a relatively long useful pot life when in covered containers. In continuous printing, ink is consumed and replenished continuously and the press can be operated for several days without frequent press shutdown for cleaning, unless the ink is exposed to high humidity and temperature.

Additionally it should be noted that the present printing inks can be conveniently prepared as two component mixtures which exhibit indefinite shelf-life and facilitate admixture prior to use.

The printing ink compositions of this invention can be used on polymeric film substrates such as regenerated cellulose, treated polyethylene, polyethylene terephthalate, vinyl chloride-vinylidene chloride copolymer, polyvinylidene chloride, polyvinyl formal, polyvinyl butyral, polymethylmethacrylate, polystyrene acrylonitrile, cellulose acetate, glassine and the like. These ink compositions are especially effective for printing on regenerated cellulose films such as sausage casing because the excess isocyanate groups react with the cellulose as well as with water and glycerine generally present in such casing, to provide outstanding adhension.

The examples which follow serve to illustrate this invention. All percentages given are by weight unless otherwise indicated. Example 1 immediately below sets forth a preferred printing ink formulation.

Example 1

A polyurethane printing ink was prepared having the following formulation:

| | |
|---|---|
| Pigmented polyester polyol prepolymer prepared by grinding 68.6% titanium dioxide, and 29.4% of polyhydroxy polyester of 1,4-butanediol and adipic acid (sold under the tradename of Multron R-16). Two percent methyl cellosolve acetate was also added to facilitate grinding, grams | 1350 |
| Hardener (pigmented)—Pigmented cellulose acetate butyrate containing 60% titanium dioxide and 40% ½ second cellulose acetate butyrate, grams | 1800 |
| Isocyanate prepolymer (solution) containing 75% prepolymer of 3 moles of tolylene diisocyanate and 1 mole trimethylol propane and 25% ethyl acetate, grams | 600 |
| Solvent—2-nitropropane, grams | 7200 |
| Ratio of NCO/OH | 2.5/1.0 |

The printing ink was prepared by charging 7200 grams of 2-nitropropane in a container equipped with a high speed stirrer. The pigmented cellulose acetate butyrate (chips) was added with stirring until the total amount had been dissolved (approximately 2 hours). The entire amount of pigmented polyester was then charged to and admixed with the stirred mixture. Stirring for a period of 15 minutes was sufficient to attain admixture. This mixture was found to be stable over long periods of time.

In order to prepare the final composition for use as a printing ink, the polyisocyanate prepolymer was added to the base mixture prepared above, with nominal stirring. The viscosity value of the final ink composition was from 10 to 12 seconds as measured in a No. 3 Zahn cup. This printing ink was applied to cellulose film by means of a flexographic press. The printed cellulose film was passed through a 16 foot long hot air dryer at a rate of 350 feet per minute while maintaining an air temperature of from 150° to 200° F. At the end of the dryer the solvent had been effectively evaporated and the imprint was sufficiently tack-free that it did not offset on reeling.

After a storage period of about 18 hours the printed impression had hardened sufficiently that it was no longer soluble in 2-nitropropane and the adhesion to the cellulose film was excellent when tested by boiling in water for 2 minutes and scratching with fingernail. The printing run lasted 8 hours.

Example 2

In the same manner as described in Example 1 above the following printing ink formulations were prepared and evaluated:

| | |
|---|---|
| Formulation No. 2a—Ratio of NCO/OH | 3.8/1.0 |
| Pigmented polyester polyol prepolymer containing: 68.6% titanium dioxide, 29.4% polyhydroxypolyester of 1,4-butanediol and adipic acid, and 2.0% methyl Cellosolve acetate, grams | 85 |
| Hardener (pigmented)—40% ½ second cellulose acetate butyrate and 60% titanium dioxide, grams | 50 |
| Isocyanate prepolymer (solution) containing 75% prepolymer of 3 moles of tolylene diisocyanate and 1 mole of trimethylol propane, in 25% ethyl acetate, grams | 38 |
| Solvent—n-butyl acetate, grams | 423 |
| Formulation 2b—ratio of NCO/OH | 5.0/1.0 |
| Pigmented polyester polyol prepolymer—same as used in Formulation 2a, grams | 4100 |
| Hardener—same as used in Formulation 2a, grams | 1260 |

| | |
|---|---:|
| Isocyanate prepolymer—same as used in Formulation 2a, grams | 1800 |
| Solvent—isopropylacetate, grams | 5500 |
| Formulation 2c—ratio of NCO/OH | 3.9/1.0 |
| Pigmented polyester polyol prepolymer—same as used in Formulation 2a, grams | 1530 |
| Hardener—same as used in Formulation 2a, grams | 900 |
| Isocyanate prepolymer—same as used in Formulation 2a, grams | 690 |
| Solvent—same as used in Formulation 2b, grams | 4500 |
| Formulation 2d—ratio of NCO/OH | 3.1/1.0 |
| Pigmented polyester polyol prepolymer—same as used in Formulation 2a, grams | 1400 |
| Hardener—same as used in Formulation 2a, grams | 1400 |
| Isocyanate prepolymer—same as used in Formulation 2a, grams | 640 |
| Solvent—same as used in Formulation 2b, grams | 5000 |
| Formulation 2e—ratio of NCO/OH | 2.5/1.0 |
| Pigmented polyester polyol prepolymer—same as used in Formulation 2a, grams | 1350 |
| Hardener—same as used in Formulation 2a, grams | 1800 |
| Isocyanate prepolymer—same as used in Formulation 2a, grams | 594 |
| Solvent (mixed)— | |
| Isopropyl acetate, grams | 6250 |
| n-Butyl acetate, grams | 1250 |
| Formulation 2f—ratio of NCO/OH | 2.2/1.0 |
| Pigmented polyester polyol prepolymer—same as used in Formulation 2a, grams | 30 |
| Hardener—same as used in Formulation 2a, grams | 50 |
| Isocyanate prepolymer—same as used in Formulation 2a, grams | 13.2 |
| Solvent—n-butyl acetate, grams | 100 |
| Formulation 2g—ratio of NCO/OH | 2.5/1.0 |
| Pigmented polyester polyol prepolymer—same as used in Formulation 2b, grams | 1350 |
| Hardener—same as used in Formulation 2b, grams | 1800 |
| Isocyanate prepolymer—same as used in Formulation 2b, grams | 600 |
| Solvent—isobutyl acetate, grams | 7000 |
| Formulation 2h—ratio of NCO/OH | 2.0/1.0 |
| Pigmented polyester polyol prepolymer, 65% titanium dioxide in 35% polyester polyol of 1,4-butanediol and adipic acid, grams | 1440 |
| Hardener—same as used in Formulation 2a, grams | 1880 |
| Isocyanate prepolymer—same as used in Formulation 2a, grams | 510 |
| Solvent—n-butyl acetate, grams | 7200 |
| Formulation 2i—ratio of NCO/OH | 5.5/1.0 |

Pigmented polyester polyol prepolymer was prepared in three colors as follows:

| | Percent |
|---|---:|
| White base | |
| Titanium dioxide | 68.6 |
| Polyester polyol as used in Formulation 2a | 29.4 |
| Methyl Cellosolve acetate | 2.0 |
| Red base | |
| Watchung Red pigment | 40 |
| Polyester polyol as used in Formulation 2a | 45 |
| Methyl Cellosolve acetate | 15 |
| Yellow base | |
| Cadmium Golden Yellow pigment | 74 |
| Polyester polyol as used in Formulation 2a | 21 |
| Methyl Cellosolve acetate | 5 |

The ink formulation had the following composition:

| | Grams |
|---|---:|
| Polyester polyol prepolymer | 20 |
| White Base | 290 |
| Red Base | |
| Yellow Base | 210 |
| Hardener, containing 60% titanium dioxide in 40%-½ second cellulose acetate butyrate | 114 |
| Isocyanate prepolymer—same as used in Formulation 2a | 283 |
| Solvent—2-nitropropane | 900 |

Each printing ink formulation was charged in turn to the reservoir of a standard flexographic printing press and printed onto cellulose film. The film was air dried and rewound as described in Example 1 above. The results are shown in Table I below:

TABLE I

| Run No. | Formulation | Press Speed, ft./minute | Oven Temperature, °F. | Print Quality | Degree of Offset |
|---|---|---|---|---|---|
| 1 | 2a | 100 | 150 | Good | None. |
| 2 | 2a | 150 | 150 | do | Do. |
| 3 | 2b | 350 | 130 | do | Do. |
| 4 | 2c | 250 | 153 | Fair | Do. |
| 5 | 1 | 250 | 153 | do | Do. |
| 6 | 1 | 250 | 153 | do | Do. |
| 7 | 1 | 250 | 153 | do | Do. |
| 8[1] | 2i | 250 | 153 | Good | Do. |
| 9 | 1 | 250 | 150 | do | Do. |
| 10 | 1 | 250 | 215 | do | Do. |
| 11 | 1 | 250 | 150 | do | Do. |
| 12 | 1 | 375 | 150 | do | Slight. |

[1] This composition produced prints of good quality but the dried ink films were brittle, and flaking resulted when the film was flexed.

*Example 3*

A white printing ink having the following formulation was prepared in the same manner as described in Example 1 above.

| | Grams |
|---|---:|
| Polyester polyol prepolymer of 1,4-butanediol and adipic acid and having a molecular weight of about 1200 | 7.4 |
| Hardener—partially hydrolyzed vinyl chloride-acetate resin containing 6% hydroxyl expressed as vinyl alcohol | 5.3 |
| Isocyanate prepolymer from the reaction of 5 moles of tolylene diisocyanate, 1 mole of trimethylol propane and 1 mole of 1,4-hexanetriol | 11.2 |
| Pigment—rutile titanium dioxide | 31.6 |
| Solvent—isopropyl acetate | 44.5 |

This ink formulation was printed on cellulose film and air dried in a manner described in Example 1. The print quality was good and no offset occurred on reeling.

*Example 4*

A red printing ink having the following formulation was prepared and evaluated as described in Example 1 above:

| | Grams |
|---|---:|
| Polyester polyol prepolymer as used in Example 3 | 11.9 |
| Hardener as used in Example 3 | 9.3 |
| Isocyanate prepolymer as used in Example 3 | 11.8 |
| Pigment (titanium dioxide 1.1 grams, light cadmium red 1.6 grams permanent red 2b 7.2 grams) | 9.9 |
| Solvent—n-butyl acetate | 57.1 |

This ink gave good prints on cellulose film with no offset after drying and reeling.

What is claimed is:

1. A printing ink composition comprising (1) a polyol prepolymer, selected from the group consisting of polyester polyol prepolymer obtained from the esterification products of polyhydric alcohols and polycarboxylic acids, castor polyol prepolymers obtained from the polyol derivatives of castor oil, and polyether polyol prepolymers obtained from the alkylene oxide adducts of polyhydroxy alkanes, trialkanol amines, or polyamines (2) a polyisocyanate prepolymer, obtained from the reaction product of an organic polyisocyanate and a polyhydric alcohol (3) a polymeric resin hardener selected from the group consisting of cellulose acetate butyrate, cellulose butyrate, cellulose acetate proprionate, partially hydrolyzed polyvinyl chloride-acetate, or polyvinyl butyral and which is compatible with said polyol prepolymer and said polyisocyanate and which contains at least one group per molecule which can react with isocyanate groups, said reactive groups of said polymeric resin hardener being selected from the class consisting of hydroxyl groups, amine groups, amide groups or carboxylic acid groups (4) a pigment and (5) a solvent for the polymeric components of the composition, wherein said polyisocyanate prepolymer is present in an amount such that the available free isocyanate groups to available free polyol hydroxyl groups are in a ratio of from between about 2:1 to 5:1; and wherein said polymeric resin hardener is present in an amount effective to prevent offset of said ink composition without imparting brittleness thereto, said printing ink composition being further characterized in that it is capable of being applied to a polymeric substrate and permitted to polymerize thereon in situ to a completely cured state.

2. The printing ink composition of claim 1 wherein said polymeric hardener resin is present in the amount of at least 15% by weight based on the nonvolatile resinous components of the composition.

3. The composition in claim 1 wherein the available isocyanate groups to available polyol hydroxyl groups are in a ratio of from 2.5:1 to 4.0:1.

4. The composition as described in claim 2 above wherein said hardener resin is cellulose acetate butyrate resin.

5. The ink composition of claim 2 wherein the isocyanate prepolymer is a prepolymer of tolylene diisocyanate.

6. The ink composition of claim 2 wherein the polyester polyol prepolymer is the adipic acid polyester polyol of 1,4-butanediol.

7. A printing ink composition comprising the adipic acid polyester polyol of 1,4-butanediol, a polyisocyanate prepolymer of tolylene diisocyanate and trimethylol propane, cellulose acetate butyrate, a pigment and a solvent, wherein said polyisocyanate prepolymer is present in an amount such that the available free isocyanate groups to available free polyol hydroxyl groups are in a ratio of from between about 2:1 to 5:1; and wherein said cellulose acetate butyrate is present in the amount of at least 15% by weight based on the nonvolatile resinous components of the composition said printing ink composition being further characterized in that it is capable of being applied to a polymeric substrate and permitted to polymerize thereon in situ to a completely cured state.

8. An article of manufacture which comprises a polymeric film substrate selected from the group consisting of regenerated cellulose, treated polyethylene, polyethylene terephthalate, vinyl chloride-vinylidene chloride copolymer, polyvinylidene chloride, polyvinyl formal, polyvinyl butyral, polymethyl methacrylate, polystyrene acrylonitrile, cellulose acetate and glassine, said polymeric film substrate having on the surface thereof an imprint consisting essentially of the cured ink of claim 1.

9. An article of manufacture which comprises a cellusoic film having on the surface thereof an imprint consisting essentially of the cured ink of claim 1.

10. A method of printing a polymeric film substrate with a printing ink composition which includes the steps of:
(a) dissolving a polymeric resin hardener selected from the group consisting of cellulose acetate butyrate, cellulose butyrate, cellulose acetate proprionate, partially hydrolyzed polyvinyl chloride-acetate or polyvinyl butyral, into a solvent to obtain a solution, said polymeric resin hardener containing at least 0.5% free hydroxyl groups and the reactive groups of said polymeric resin hardener being selected from the class consisting of hydroxyl groups, amine groups, amide groups or carboxylic acid groups;
(b) blending into said obtained solution a pigment and a polyol prepolymer to obtain a mixture, said polyol prepolymer being selected from the group consisting of polyester polyol prepolymers obtained from the esterification products of polyhydric alcohols and polycarboxylic acids, castor polyol prepolymers obtained from the polyol derivatives of castor oil, and polyether polyol prepolymers obtained from the alkylene oxide adducts of polyhydroxy alkanes, trialkanolamines, or polyamines;
(c) adding to said mixture a polyisocyanate prepolymer obtained from the reaction product of an organic polyisocyanate and a polyhydric alcohol to obtain a printing ink composition wherein said polyisocyanate prepolymer is present in an amount such that the available free isocyanate groups to available free polyol hydroxyl groups are in a ratio of from between about 2:1 to 5:1 and wherein said polymeric resin hardener is present in the amount of at least 15% by weight based on the non-volatile resinous components of said printing ink composition;
(d) applying said printing ink composition to a polymeric substrate;
(e) subjecting said imprinted polymeric film substrate to a heated atmospheric environment until said printing ink is in a tack-free state; and,
(f) removing said imprinted polymeric film substrate from said heated atmospheric environment and permitting said printing ink composition to polymerize thereon in situ to a completely cured state.

11. The method of claim 10 wherein said ink imprint is rendered to a tack-free condition in a period of from between about 1 second to 15 seconds while subjected to said heated atmospheric environment which is maintained at a temperature of from between about 100° to 250° F.

12. A printing ink composition comprising
(a) resinous, nonvolatile component comprised of by weight
(1) polyisocyanate prepolymer 25 to 45% obtained from the reaction product of an organic polyisocyanate and a polyhydric alcohol
(2) polyol prepolymer 20 to 40% selected from the group consisting of polyester polyol prepolymers obtained from the esterification products of polyhydric alcohols and polycarboxylic acids, castor polyol prepolymers obtained from the polyol derivatives of castor oil, and polyether polyol prepolymers obtained from the alkylene oxide adducts of polyhydroxy alkanes, trialkanolamines or polyamines
(3) polymeric resin hardener 15 to 50% selected from the group consisting of cellulose acetate butyrate, cellulose butyrate, cellulose acetate proprionate, partially hydrolyzed polyvinyl chloride-acetate, or polyvinyl butyral which is compatible with said polyol prepolymer and said polyisocyanate and which contains at least one group per molecule which can react with isocyanate groups, said reactive groups of said polymeric resin hardener being selected from the class consisting of hydroxyl groups, amine groups, amide groups or carboxylic acid groups, such that the available free isocyanate groups to available free polyol hydroxyl groups are in a ratio of from between about 2:1 to 5:1,
(b) pigment 20% to 60% based on the weight of the total nonvolatile components of the ink composition
(c) solvent 50% to 80% based on the weight of the ink composition, said printing ink composition being further characterized in that it is capable of being applied to a polymeric substrate and permitted to polymerize thereon in situ to a completely cured state.

13. The printing ink composition of claim 12 wherein the resinous nonvolatile components comprised of by weight are comprised of
  (1) polyisocyanate prepolymer 27% to 35%.
  (2) polyol prepolymer 22% to 28%.
  (3) polymeric resin hardener 40% to 45%.

14. The method of claim 10 wherein the polymeric film substrate is selected from the group consisting of regenerated cellulose, treated polyethylene, polyethylene terephthalate, vinyl chloride-vinylidene chloride copolymer, polyvinylidene chloride, polyvinyl formal, polyvinyl butyral, polymethyl methacrylate, polystyrene acrylonitrile, cellulose acetate and glassine.

15. The method of claim 14 wherein the polymeric film substrate is regenerated cellulose.

References Cited by the Examiner
UNITED STATES PATENTS

| | | | |
|---|---|---|---|
| 2,948,691 | 8/1960 | Windemuth et al. | 260—13 |
| 3,115,479 | 12/1963 | Windemuth et al. | 260—13 |
| 3,192,287 | 6/1965 | Pelzek et al. | 260—858 |

WILLIAM H. SHORT, *Primary Examiner.*

J. NORRIS, *Assistant Examiner.*